Fig.1A.

Results Of Filtration Test For Run No. 41

Effect Of pH On COD And Solids Reductions

Fig. 4A. Treatment With Air At 150°C, 100 p.s.i.g. And pH = 3.5

Fig. 4B.

Fig. 4C. Effect Of Residence Time On Sludge Treatment

INVENTOR
William Schotte
BY Harry J. McCauley
ATTORNEY

Fig.5.

Effect Of Temperature On Sludge Filterability

Fig. 6A.
Treatment With Air For 2 Hours At pH=3.5

Fig. 6B.

Effect Of Temperature On COD And Solids Reductions

Fig. 7.

United States Patent Office 3,649,534
Patented Mar. 14, 1972

3,649,534
WET OXIDATION OF ACIDIFIED ACTIVATED SLUDGE
William Schotte, Wilmington, Del., assignor to E. I. du Pont de Nemours and Company, Wilmington, Del
Filed May 15, 1970, Ser. No. 37,704
Int. Cl. C02c 5/04
U.S. Cl. 210—63
2 Claims

ABSTRACT OF THE DISCLOSURE

Improving the filterability and other properties of activated sewage sludge by oxidation of the acidified sludge for a period of about 2 hours while maintaining at a temperature of about 120–170° C.

BRIEF SUMMARY OF THE INVENTION

Generally, this invention comprises the process of improving the filterability of activated sewage sludge by, in sequence, (1) adjusting the pH of the sludge to a value in the range of about 2.0 to 5.0 (preferably about 3.5), (2) heating the sludge to a temperature in the range of about 120–170° C. (preferably about 150° C.) while maintaining at a preselected pressure below which the water content of the sludge remains primarily liquid and (3) oxidizing the sludge by contact with an oxygen-containing gas (preferably air) for a period of time (typically 2 hours) sufficient to reduce the chemical oxygen demand of the sludge by about 5–20%.

Sewage is commonly disposed of by (1) filtering or settling the raw as-received sewage to remove the bulk of entrained solids as "primary sludge," (2) subjecting the liquid fraction to an aerobic step wherein ½ to ⅔ of the organic components are bio-oxidized, thereby producing a "secondary sludge," (3) settling and/or filtering, thereby producing a clear effluent for further reclamation (natural or otherwise), which still, however, contains much dissolved, and some suspended, organic compounds, and (4) combining the secondary sludge with the primary sludge and, after anaerobic digestion, to break down the water-binding organic solids, and dewatering disposing by incineration, land fill or compost making.

The "activated-sludge" process is a variation of the foregoing in which the secondary sludge is wholly or partially recirculated to the beginning of the aerobic step, acting as inoculant, to seed the incoming primary effluent with the biological flora to "activate" this step. As a result of this activation, the aerobic step in a given hold-up time is effective to produce a higher degree of oxidation of the organics, e.g., up to about 90%, and the secondary effluent is accordingly reduced in both chemical oxygen demand (COD) and biological oxygen demand (BOD). Unfortunately, this process has the serious disadvantage that it produces a sludge of a slimy gelatious nature which is extremely difficult to settle, filter or centrifuge.

It is the objective of this invention to improve the filterability of this sludge from the activated sludge process.

The activated sludge process produces a so-called "activated sludge" which analyzes about 1% solids and 99% water. It is very difficult to dispose of and resort has been to lagooning for anaerobic digestion of the sludge. However, this requires al arge pond in a secluded location, because it is a slow process and there are objectionable odor problems. An alternative is barging to the sea, where possible; however, this in expensive and, moreover, pollutes the ocean.

There is a growing interest in vacuum filtration or centrifugation of activated sludges. The specific filtration resistance then becomes an important consideration. It constitutes a measure of the resistance to filtration per unit of suspended solids.

Specific filtration resistance is evaluated by a Standard Buchner funnel filtration test described by P. Coackley in "Biological Treatment of Sewage and Industrial Wastes," vol. II, pp. 270–291, edited by J. McCabe and W. W. Eckenfelder, Jr., Reinhold Co., N.Y.C. (1958).

The procedure involves the use of a size 1A Coors porcelain Buchner funnel with an internal area of 38.5 cm.$^2$. This is mounted on a graduate through the intermediary of an adapter connected to a manometer and a vacuum system. A Moore vacuum regulator maintains a constant vacuum of about ½ atmosphere. All tests are made with three pieces of filter paper, of which two pieces are No. 41 Whatma paper disposed on the bottom, with either a Whatman No. 42 (fine) or a Whatman No. 4 (coarse) on top.

The time required to collect a given volume V, of the filtrate is expressed by the equation:

$$\theta = \frac{\mu rc}{2PA^2} \cdot V^2 + \frac{\mu R}{PA} \cdot V \qquad (1)$$

where:

$\theta$=time, sec.
$\mu$=viscosity of the filtrate, poise
$r$=specific filtration resistance, sec.$^2$/g.
$c$=suspended solids concentration in initial slurry, g./ml
$P$=filtration pressure, g./cm.$^2$
$A$=filter area, cm.$^2$
$V$=volume of filtrate, ml.
$R$=resistance of the filter medium, sec.$^2$/cm.$^2$ Strictly speaking, Equation 1 should also contain the dimensional constant, $g_c$=981 (mass-g.) (cm.)/force-g) (sec.)$^2$, in which case $r$ and $R$ should be multiplied by $g_c$.

However, very few investigators have included $g_c$ and, for ease of comparing results, the constant has also been omitted here.

Measurements were made by recording the volume of filtrate collected as a function of time. The stopwatch was started when about 10–20% of the filtrate was collected in order to allow some time for the formation of a thin layer of cake. Typical results are shown below.

Filtration test for Run No. 41 (hereafter reported):
Sludge volume: 378 cc.
Filtrate: 365 cc.
Temperature: 24.7° C.
$\mu$=0.00923 poise
$P$=381 mm., Hg=16 g./cm.²
Solids: 2.7719 g.
$c$=0.00733 g./ml.

| Time, sec. | Filtrate, ml. | V, ml. | $\theta/V$ sec./ml. |
|---|---|---|---|
| 0 | 50 | 0 | |
| 18 | 100 | 50 | 0.360 |
| 29 | 125 | 75 | 0.387 |
| 41 | 150 | 100 | 0.410 |
| 6=1 | 190 | 140 | 0.435 |
| 67 | 200 | 150 | 0.446 |
| 96 | 250 | 200 | 0.480 |
| 112 | 275 | 225 | 0.498 |
| 129 | 300 | 250 | 0.516 |
| 148 | 325 | 275 | 0.539 |

For graphical analysis, it is convenient to divide the terms in Equation 1 by V, which gives:

$$\theta = bV + a$$

Figure 1:
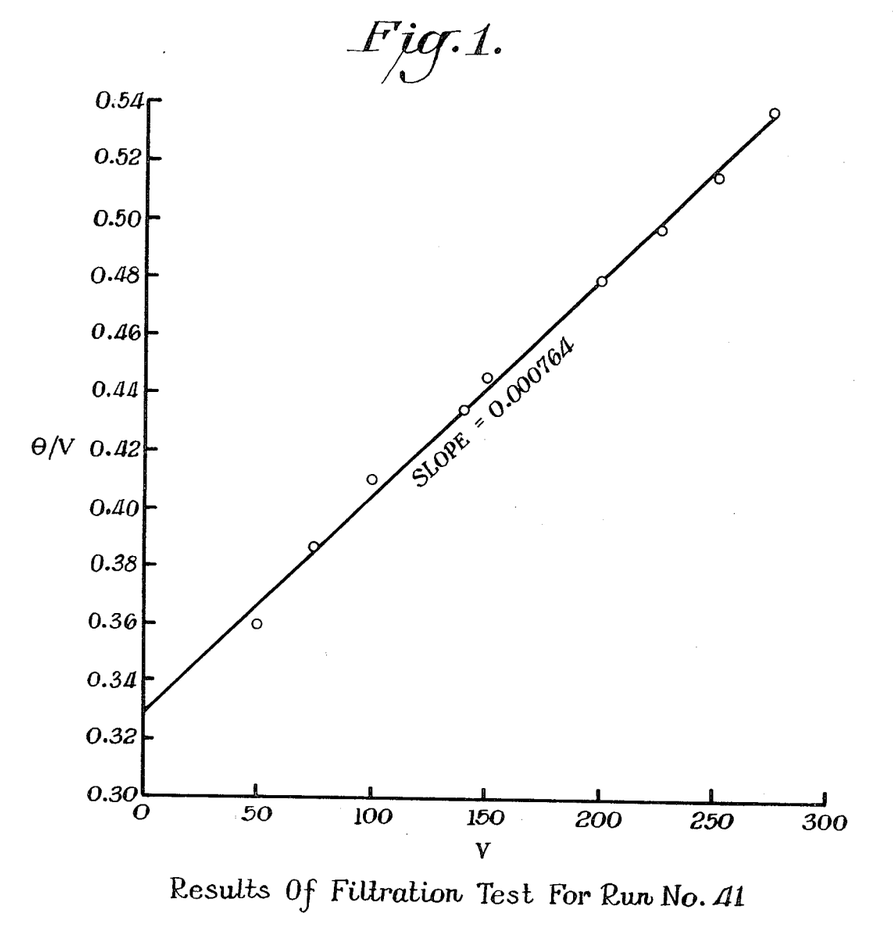
FIG. 1 is a plot of $\theta/V$, i.e., the time $\theta$ required to obtain a given volume of filtrate, V, as ordinate against V as abscissa, as these values relates in the determination of the specific filtration resistance of seweage sludge.

The result is a straight line when $(\theta/V)$ is plotted against V. The slope is $b=(\mu c)/(2PA^2)$ and the intercept is $a=(\mu R)/(PA)$. The graph for the above measurements is shown in FIG. 1. A slope $b=0.000764$ was measured. The specific filtration resistance was:

$$r = \frac{2bPA^2}{\mu c} = 1.73 \times 10^7 \text{ sec. }^2/g.$$

Although the specific filtration resistance is supposed to be a constant for a certain cake material, it is frequently dependent on the filtration pressure because of compressibility of the cake. A nearly constant pressure of about 0.5 atm. was used in my investigation and compressibility measurements were not made.

A detailed study reported by J. D. Swanwick, F. W. Lussignea and R. C. Baskerville, "Recent Work on the Treatment and Dewatering of Sewage Sludge," Paper No. 30, International Conference on Water Pollution Research, London, September 1962, has shown that a specific filtration resistance of less than $4 \times 10^8$ sec.²/g. is required for vacuum filtration. By way of comparison, typical values from some well-known materials are given in Table 1 infra.

Thus, continuous filtration or centrifugation of activated sludge is ordinarily impossible. Pre-treatment with floc-forming chemicals, such as ferric chloride and lime, or polyelectrolytes, can produce filterable material. However, in addition to the expense of these materials, large and costly filters or centrifuges are still required.

U.S. Pat. 2,075,224 issued Mar. 30, 1937 to W. K. Porteous teaches the improvement of filterability of activated sludges by heating to between 160 and 190° C., which causes a breakdown of the gel structure and a coalescense of the particles. Good results have been reported for municipal sewage sludges consisting of either primary sludge (i.e., solid material in sewage as-received) or mixtures of primary and activated sludge. However, a study by the National Council for Stream Improvement (R. H. Follett "Effects of Heat on Dewaterability of Biological Sludges," National Council for Stream Improvement Bill. No. 207, not dated) has shown that heat treatment of activated sludge alone gives only a small improvement in the filtration rate. It has therefore hitherto been concluded that heat-treated activated sludges, could not be dewatered by vacuum filtration.

As regards oxidation, U.S. Pat. 3,272,740 issued Sept. 13, 1966 to W. B. Gitchel et al., teaches aeration of sludge by passage of air therethrough at a temperature above 170° C., to effect a degree of oxidation between 5% and 45% (preferably 10–35% at a temperature of 200–225° C. ). This is effective to reduce the specific filtration resistance of a digested primary sludge from about $2000 \times 10^7$ sec.²/g. to a level as low as $4 \times 10^7$ sec.²/g. G. H. Teletzke has reported (Proc. 20th Ind. Waste Conference, pp. 40–48, Purdue University, May 1965) that some tests indicate that activated sludge so treated can be improved to a specific filtration resistance of about $14 \times 10^7$ sec.²/g. for partial oxidations of 15 to 23%. However, this process is relatively costly, since not only high temperatures are required but also relatively high pressures, in order to keep most of the water in the liquid state. For example, the vapor pressure of water at 200° C. is already 211 p.s.i.g., indicating that an operating pressure of the order of 300 p.s.i.g. is needed.

J. A. Wilson et al. has reported (Ind. Eng. Chem. 15, pp. 956–59 (1923)) a study on the effects of combined acid and heat treatment on sludge filtration. They found an optimum pH of 3.4 and an optimum temperature of 190° F. (88° C.). Under these conditions, the filtration rate of their sludge, which was a mixture of primary and activated sludges, was increased by a factor of 30. Partial oxidation was not combined with the treatment utilized.

My invention is a process improving the wet oxidation of activated sludge in order to increase the filterability of the sludge by at least an order-of-magnitude while, at the same time, lowering the temperatures and pressures necessary, thereby reducing both investment and operating costs.

The essential features of my improved process comprise (1) mixing an acid such as sulfuric acid with the activated process sludge in an amount sufficient to reduce the pH of the sludge to a value less than about 5, preferably about 3.5, (2) heating the sludge to a temperature in the range of about 120–170° C. (preferably 150° C.) while maintaining sufficient pressure to keep the water content largely liquid, and (3) oxidizing the heated sluge by contacting it with an oxygen-containing gas, preferably air, while maintaining the temperature for a period of time sufficient to reduce the chemical oxygen demand by 5–20%, this time being approximately 2 hours. As a result of the acidification of the sludge prior to wet oxidation, the filterability of the resulting partially oxidized product is improved an order of magnitude or more as contrasted with non-acidified sludge, and the oxidation rate is such that only a two-hour exposure at 120–170° C. is required to secure the desired degree of chemical oxygen demand reduction.

Table 1 affords a comparison of filtration resistance for typical ordinary materials (e.g., carbon, $CaCO_3$ and $Fe(OH)_3$) and for prior art sewage sludge processes with this invention:

TABLE 1

Comparison of filtration resistances

| | Filtration resistance $10^7$ sec.²/gm. |
|---|---|
| Powdered activated carbon | 0.3 |
| Precipitated $CaCO_3$ | 2.0 |
| Gelatinous $Fe(OH)_3$ | 300 |
| Activated sludge, untreated | ([1]) |
| Teletazke report supra—activated sludge, partial oxidation | 14.0 |
| Activated sludge: | |
| Acidified heated | 62.3 |
| Activated sludge, heated | 7,750.0 |
| This invention | 1.0–2.0 |

[1] From 30.0 to 6,000.0.

Figure 1A:
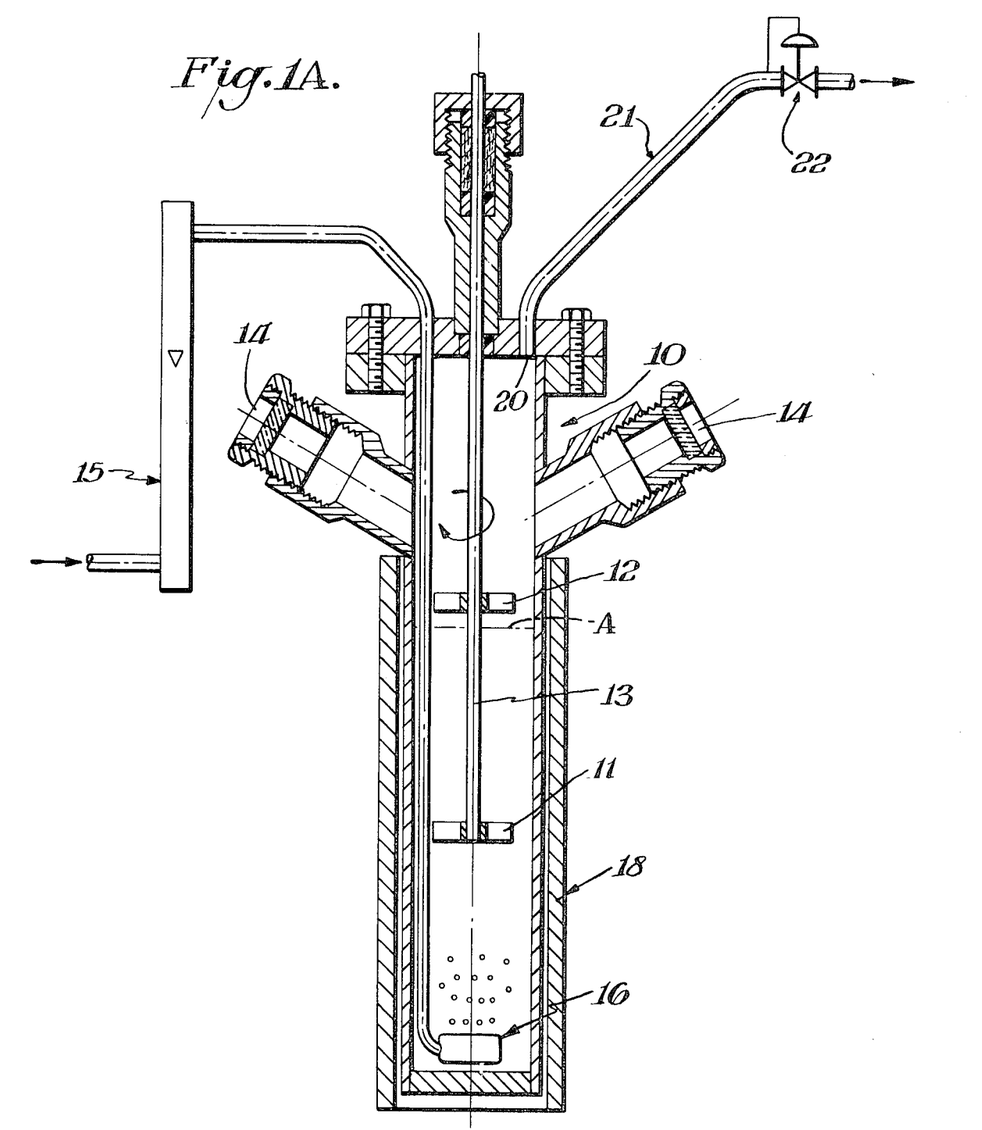
FIG. 1A is a schematic representation of the laboratory apparatus utilized in conducting the sludge treatment of this invention.

FIG. 1A shows a simple sludge treatment apparatus which was constructed to conduct tests resolving the parameters of this invention.

The batch reactor 10 was a 14 9/16" length of 2" Schedule 40 Type 316 stainless steel pipe (2.067" I.D.). All runs were carried out with about 400 cc. of sudge, which gave a liquid height, indicated by line A, of about 7.9" at 150° C. The apparatus was equipped with two 1 7/16" dia., 4-bladed stirrers, mounted on a common shaft 13 motor-driven in the direction indicated. The lower stirrer, 11, was located mid-depth of the liquid to provide agitation, whereas the upper one, 12, was located 1" above the liquid in order to beat down the foam. Foaming could be observed through sight ports 14 fitted in the reactor body.

Heat was provided by a band heater 18 wrapped around reactor 10 and no thermal insulation was employed, so that natural convection cooling after each run was quite rapid.

All runs were carried out with pressurized air rather than oxygen, this being supplied through a rotameter 15 from a pressure cylinder (not shown). The air was metered through rotameter 15 and was, in most instances, fed into the activated sludge sample through a 20 mm. dia. Pyrex gas disperser 16 of medium porosity. Gas exhaust was via port 20 connected with a 15" length of 1/8" I.D. stainless steel tubing 21, which served as a partial air-cooled condenser, and thence out through a conventional back pressure regulator 22.

The gas inlet temperature and pressure, the reactor temperature and pressure, air flow rate and agitator speed were all measured during the test runs.

The first sludges treated were from activated sludge processes carried out at two different industrial sites, denoted, respectively, W and B, which were dissimilar diversified product chemical manufacturing establishments. Site W produces synthetic textile products, whereas site B produces a variety of heavy chemicals. Sanitary sewage was not a component of the activated sludge processes employed at either site. The initial character of typical original sludges is given in Table 2.

TABLE 2.—ORIGINAL SLUDGES
[All are activated sludges]

| Source No. | pH | Filtration resistance, $10^7$ sec.$^2$/gm. | COD, g./l. | Solids, g./l. |
|---|---|---|---|---|
| W1 (as received) | 7.0 | 2,730 | 7.66 | 4.49 |
| W2 (as received) | | 540 | 14.78 | 10.95 |
| W2 (12 days aging) | 7.2 | 1,560 | | 10.45 |
| W3 (10 days aging) | 7.4 | 2,040 | 11.50 | 9.13 |
| W4 (as received) | 7.8 | 32.2 | 15.74 | 12.68 |
| W4 (8 days aging) | 7.5 | 111 | 15.16 | 12.93 |
| W5 (as received) | 7.3 | 244 | 11.10 | 7.66 |
| W5 (9 days aging) | 7.4 | 998 | | 7.46 |
| B1 (as received) | 7.0 | 1,800 | 21.01 | 15.18 |
| B1 (7 days aging) | 7.0 | 2,630 | | 14.44 |

The runs were of 2 hours' duration, not including a 30 minute preheat and a 45 minute terminal cooling period. Light stirring at about 120 r.p.m. was employed during preheating, this being increased to 200 r.p.m. during the cooking period. There was no stirring during the terminal cooling.

The treated sludge was removed by pouring the contents of the reactor into a beaker and adding to it any solids remaining on the stirrer and reactor surfaces. It was observed that there was only a slight buildup of solids during any given test run, and this occurred primarily on the upper stirrer 12 and on the reactor wall immediately above level line A.

(a) Effect of pH

Two different batches of activated sludge from the source W were used to study the effect of pH. In general, $H_2SO_4$ was used for the pH adjustment, although HCl was used for one of the runs (No. 43) without perceptible difference. In all instances the treatment was of 2 hours' duration with air at 150° C. and 100 p.s.i.g. The results obtained are shown in Table 3 and FIGS. 2, 3A and 3B.

TABLE 3.—EFFECT OF pH ON SLUDGE TREATMENT
[Treatment for 2 hours at 150° C. and 100 p.s.i.g.]

| | Method of treatment | Initial pH | Final pH | Filtration resistance, $10^9$ sec.$^2$/g. | COD, g./l. | Percent COD reduction | Solids, g./l. | Percent solids reduction | Lb. acid, 1,000 gal. |
|---|---|---|---|---|---|---|---|---|---|
| A. Run No.: | Sludge No. 6 (as received) | 6.9 | | 154 | 15.68 | | 11.85 | | |
| 28 | $H_2SO_4$_air | 3.5 | 4.2 | 0.94 | 13.37 | 15.0 | 5.94 | 48.6 | 4.8 |
| 29 | ____do____ | 2.5 | 3.6 | 2.34 | 13.50 | 14.2 | 6.02 | 47.9 | 8.1 |
| 30 | ____do____ | 4.5 | 4.9 | 4.42 | 13.12 | 16.6 | 5.78 | 50.0 | 2.9 |
| 31 | Air | 7.0 | 6.5 | 1,350 | 13.15 | 16.4 | 7.31 | 36.8 | 0 |
| 32 | $H_2SO_4$_air | 5.5 | 5.9 | 1,210 | 16.20 | | 5.98 | 48.3 | 1.7 |
| 33 | ____do____ | 3.5 | 4.4 | 1.67 | 14.43 | 8.3 | 6.16 | 46.7 | 4.8 |
| 34 | ____do____ | 5.5 | 5.6 | 97.8 | 13.57 | 13.7 | 6.13 | 47.0 | |
| 35 | ____do____ | 1.5 | 2.1 | 5.55 | 11.18 | 28.9 | 4.73 | 59.1 | 36.7 |
| B. | Sludge No. 7 (as received) | 7.3 | | 541 | 17.43 | | 12.42 | | |
| 36 | Air | 7.3 | 6.2 | 4,460 | 15.23 | 11.8 | 6.42 | 48.1 | |
| 37 | $H_2SO_4$ plus air | 3.5 | 3.6 | 0.76 | 14.93 | 13.5 | 6.83 | 44.8 | 9.8 |
| 38 | ____do____ | 5 | 4.5 | 9.62 | 15.16 | 12.2 | 7.90 | 36.2 | 5.7 |
| 39 | ____do____ | 2 | 2.7 | 2.79 | 13.74 | 20.4 | 6.12 | 50.6 | 19.9 |
| 40 | ____do____ | 4 | 4.4 | 2.82 | 15.66 | 9.3 | 8.34 | 32.6 | 6.2 |
| 41 | ____do____ | 3 | 3.5 | 1.73 | 15.52 | 10.1 | 7.33 | 40.8 | 10.4 |
| 42 | ____do____ | 6 | 5.6 | 1,050 | 16.10 | 6.7 | 6.61 | 46.6 | |
| 43 | HCl plus air | 3.5 | 3.8 | 1.18 | 15.35 | 11.1 | 7.23 | 41.6 | 9.8 |

Figure 2:
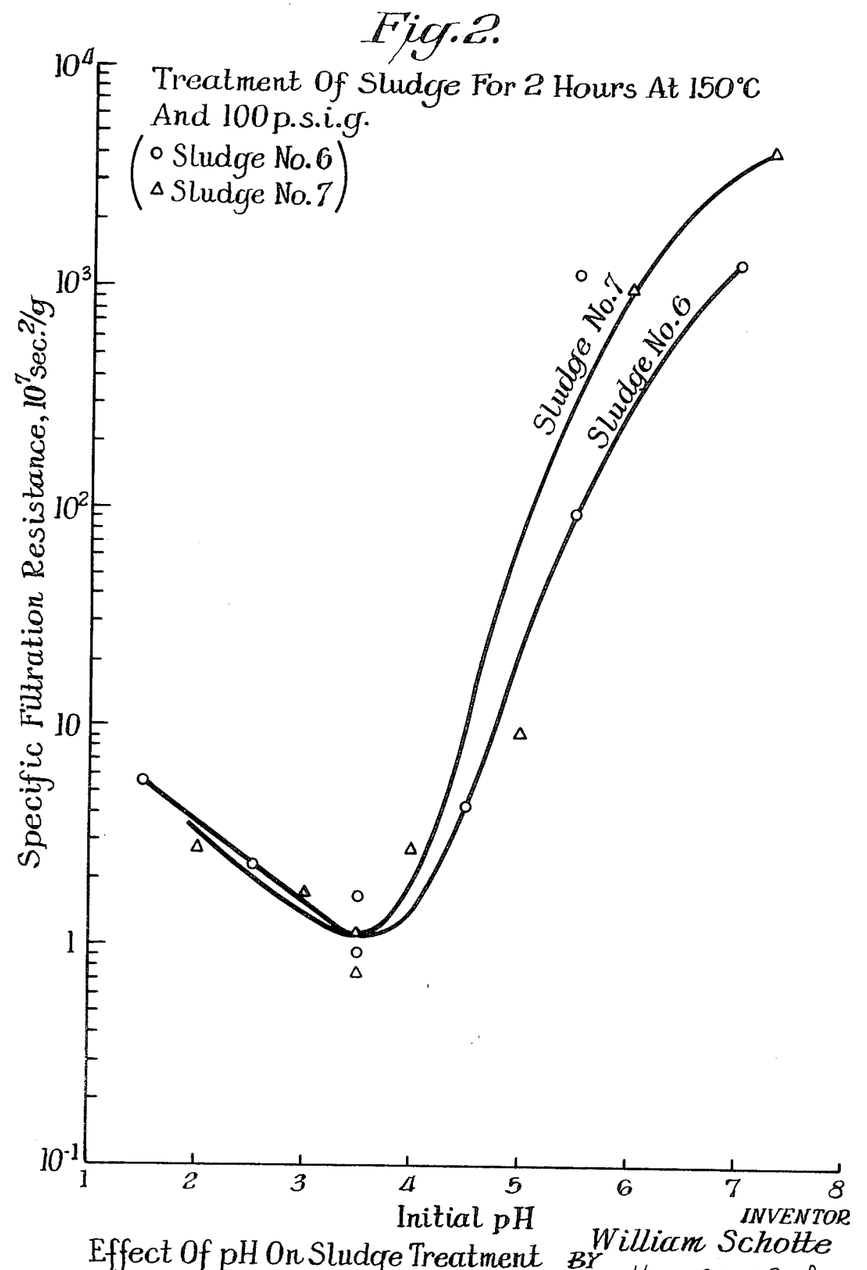
FIG. 2 is a plot of specific filtration resistance $10^7$ sec.$^2$/g. versus initial pH for two different activated sewage sludges, after treatment with air for 2 hours at 150° C. and 100 p.s.i.g.

FIG. 2 shows the effect of the adjusted initial pH on the specific filtration resistance of the treated sludge. Reproducibility was fairly good, even though the filtration resistances of the original untreated sludges differed by a factor of 3. Perfect reproducibility is probably virtually impossible to achieve due to variables which are difficult to control.

Foaming was sometimes a problem. For example, strong foaming occurred during Run #32, and this is believed responsible for the very high specific filtration resistance measured. A rerun (No. 34) at the same initial pH of 5.5 gave a much lower filtration resistance.

In this connection, it was found, late in the research program, that foaming problems could be eliminated by very low air flows or the supply of no air at all during the preheat period.

The optimum initial pH adjustment was found to be 3.5. Sludge treated at this pH showed a two or three orders-of-magnitude reduction in specific filtration resistance as compared to untreated sludge.

Figure 3A:
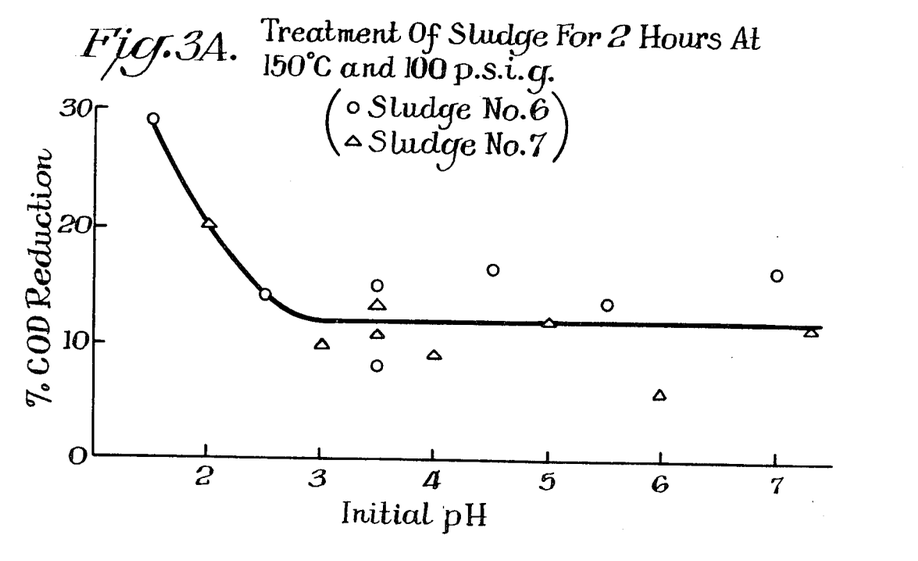
FIGS. 3A and 3B are, respectively, plots of perecnt chemical oxygen demand (abbreviated COD) reduction and percent solids reduction, individually, versus initial pH for the same two sludges of FIG. 2 after treatment with air for 2 hours at 150° C. and 100 p.s.i.g.
Figure 3B:
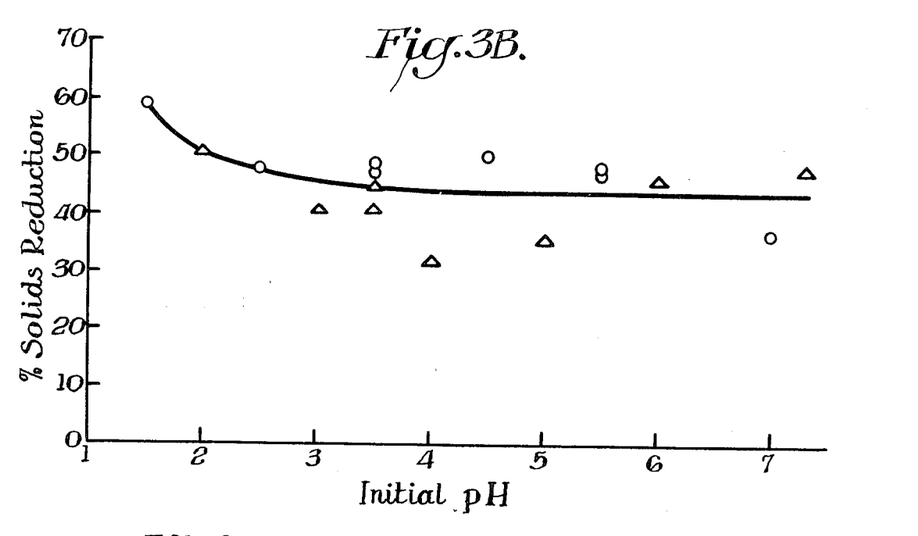

FIGS. 3A and 3B show that desirable percent chemical oxygen demand (COD) reduction and percent solids reduction of the order of 12% and about 44%, respectively, were coincidentally obtained when the pH was above 3. Even higher COD and solids reductions were obtained at pH levels below 3.

The mechanism of the oxidation of this invention is not known. Presumably, both partial oxidation and hydrolysis occur, resulting in COD and solids reductions. Some increase in pH occurs at low values of initial pH. However, at higher initial pHs there occurs a progressive reduction in pH with digestion due to the formation of organic acids.

(b) Effects of residence time

The effects of residence time at constant temperature of 150° C., pressure of 100 p.s.i.g., and initial pH of 3.5 are shown in the following Table 4 and FIGS. 4A, 4B and 4C.

Pressure did not have much effect on filtration resistance; however, surprisingly, COD and solids reductions were both somewhat decreased as the reactor pressure was increased. It might have been expected that the higher air flow rates and higher partial pressures of air should have given an increase in sludge oxidation rather than a decrease. Apparently, mass transfer of oxygen is not a limiting factor and the results obtained may have been due to some second-order effects.

TABLE 4.—EFFECT OF RESIDENCE TIME ON SLUDGE TREATMENT

[Treatment with air at 150° C., 100 p.s.i.g., and pH=3.5]

| Method of treatment | Time, hr. | Initial pH | Final pH | Filtration resistance, $10^7$ sec.$^2$/g. | COD, g./l. | Percent COD reduction | Solids, g./l. | Percent solids reduction |
|---|---|---|---|---|---|---|---|---|
| Run No.: | | | | | | | | |
| Sludge No. 8 (as received) | | 7.5 | | 119 | 20.09 | | 15.44 | |
| 44 ........ H$_2$SO$_4$ plus air | 2 | 3.5 | 3.3 | 1.08 | 17.29 | 13.8 | 8.51 | 44.2 |
| 45 ........ do | 0.5 | 3.5 | 3.7 | 1.83 | | | 10.66 | 30.0 |
| 46 ........ do | 1 | 3.5 | 3.5 | 1.78 | 18.59 | 7.3 | 9.15 | 39.9 |
| 47 ........ do | 4 | 3.5 | 3.6 | 1.98 | 17.61 | 12.2 | 7.95 | 47.8 |
| 48 ........ do | 0.5 | 3.5 | 3.8 | 2.88 | 19.27 | 3.9 | 10.90 | 28.4 |
| 49 ........ do | 3 | 3.5 | 3.6 | 1.40 | 18.47 | 7.9 | 7.77 | 49.0 |

Figure 4A:
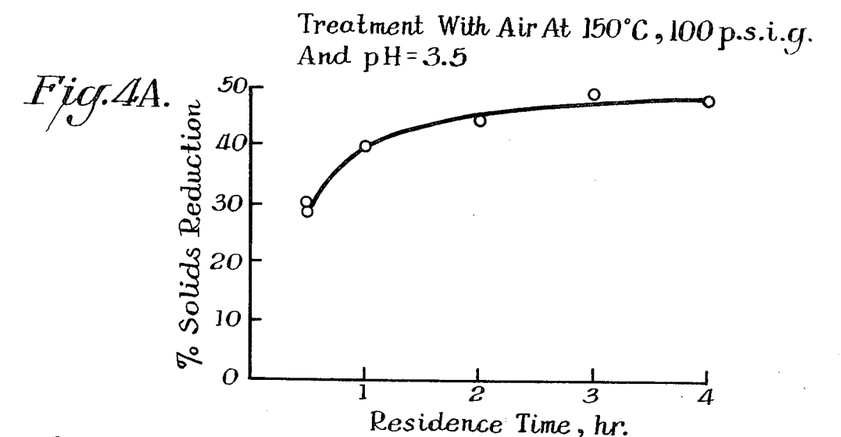
FIGS. 4A, 4B and 4C are, respectively, plots of percent solids reduction, percent chemical oxygen demand reduction and specific filtration resistance, $10^7$ sec.$^2$/g., each versus residence time in hours for a third activated sewage sludge after treatment at pH=3.5 with air at 150° C. and 100 p.s.i.g.
Figure 4B:
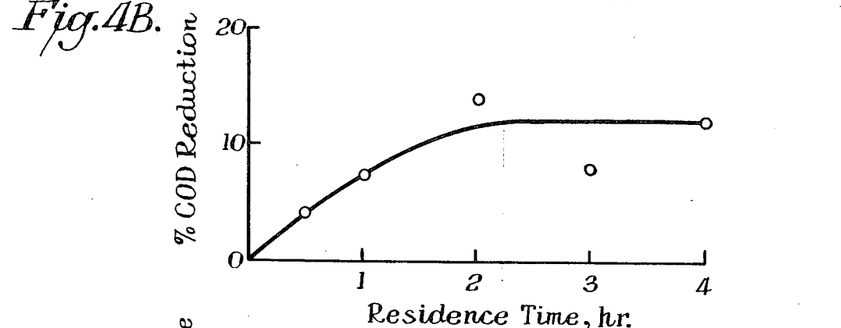
Figure 4C:
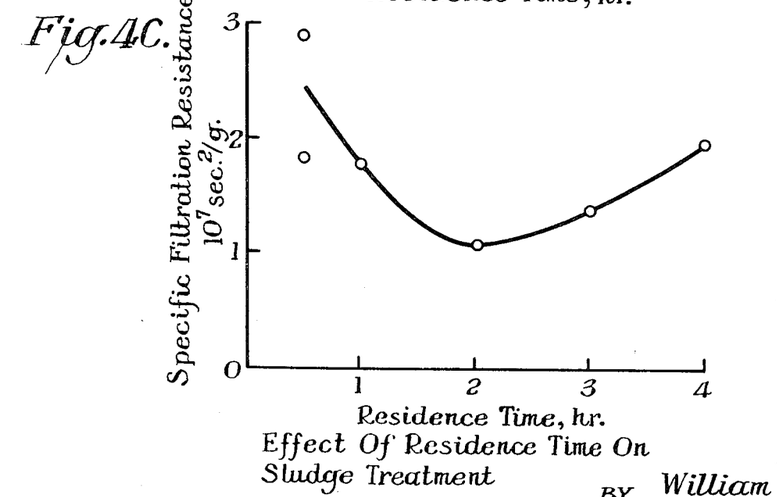

The FIG. 4 plots show that the optimum residence time was about 2 hours. COD and solids reduction increased with residence time up to 2 hours, but longer treatment gave little further improvement and may, indeed, have caused floc breakup.

(c) Effects of temperature and pressure

The effects of temperature were investigated as indicated in Table 5 over the temperature range of 110°–190° C., during which the operating pressure was adjusted to retain the partial pressure of air substantially constant.

(d) Cake and filtrate characteristics

The moisture content of the filter cake obtained is of considerable importance, since it affects the cost of disposal of the cake. Moisture analyses were made by drying cakes for periods of 4 to 18 hours (usually overnight) at 103° C.

Results for a number of experiments are set out in the following Table 6:

TABLE 6.—MOISTURE CONTENTS OF CAKES

[Treatment of sludge at 100 p.s.i.g. and pH=3.5]

| Run No. | Sludge No. | Method of treatment | Temp., °C. | Time, Hr. | Filtration resistance, $10^7$sec.$^2$/g. | COD, g./l. | Solids, g./l. | Percent moisture |
|---|---|---|---|---|---|---|---|---|
| | 6 | Untreated sludge (pH=6.9) | 25 | | 154 | 15.68 | 11.85 | 84.3 |
| 44 | 8 | H$_2$SO$_4$ plus air | 150 | 2 | 1.08 | 17.29 | 8.51 | 77.4 |
| 47 | 8 | ...do | 150 | 4 | 1.98 | 17.61 | 7.95 | 77.5 |
| 51 | 9 | H$_2$SO$_4$ plus air at 200 p.s.i.g. | 150 | 2 | 1.99 | 20.36 | 9.42 | 70.5 |
| 54 | 9 | H$_2$SO$_4$ plus air at 46 p.s.i.g. | 130 | 2 | 2.94 | 21.39 | 10.75 | 75.1 |
| 55 | 9 | H$_2$SO$_4$ plus air at 176 p.s.i.g. | 170 | 2 | 1.78 | 15.59 | 7.35 | 61.4 |
| 56 | 9 | H$_2$SO$_4$ plus air at 288 p.s.i.g. | 190 | 2 | 1.61 | 18.13 | 7.25 | 66.6 |
| 57 | 10 | H$_2$SO$_4$ plus air (53.5% of COD) | 150 | 2 | 5.84 | 40.50 | 20.6 | 76.8 |
| 58 | 10 | H$_2$SO$_4$ plus air (89.7% of COD) | 150 | 2 | 6.40 | 39.32 | 20.4 | 77.4 |
| 59 | 10 | H$_2$SO$_4$ plus air (31.5% of COD) | 150 | 2 | 22.3 | 42.17 | 20.8 | 79.0 |
| 60 | 10 | H$_2$SO$_4$ plus air (88.8% of COD) | 150 | 2 | 3.66 | 37.18 | 18.7 | 76.8 |
| 62 | 11 | H$_2$SO$_4$ plus air | 150 | 2 | 1.20 | 13.85 | 5.65 | 77.6 |
| 63 | 11 | H$_2$SO$_4$ plus air (no stirring) | 150 | 2 | 2.79 | 13.04 | 5.92 | 77.3 |
| | 12 | Untreated sludge (pH=7.0) | 25 | | 2580 | 18.12 | 11.90 | 83.5 |
| | 12 | Untreated sludge after 9 days | 24 | | 5610 | 17.51 | 11.46 | 83.4 |
| 68 | 12 | H$_2$SO$_4$ plus air | 150 | 2 | 2.51 | 15.24 | 7.31 | 74.6 |
| 71 | 12 | H$_2$SO$_4$ plus air, filtered at 59° C. | 150 | 2 | | | 6.50 | 69.0 |
| 73 | 12 | H$_2$SO$_4$ plus air | 150 | 2 | | 15.26 | 7.05 | 73.1 |
| 76 | 12 | H$_2$SO$_4$ plus air, filtered at 61° C. | 150 | 2 | | | 6.84 | 72.1 |

Some of the moisture analyses reported were for tests hereinbefore described. However, additional runs were made specifically to determine the effect of miscellaneous conditions on the cake moisture.

TABLE 5.—EFFECTS OF TEMPERATURE AND PRESSURE ON SLUDGE TREATMENT

[Treatment with air for 2 hours at pH=3.5]

| Method of treatment | Temp., °C. | Pressure, p.s.i.g. | Filtration resistance, $10^7$ sec.$^2$/g. | COD, g./l. | Percent COD reduction | Solids, g./l. | Percent solids reduction |
|---|---|---|---|---|---|---|---|
| Run No.: | | | | | | | |
| Sludge No. 9 (as received) | | | 1,170 | 25.16 | | 13.43 | |
| 50 .... H$_2$SO$_4$ plus air | 150 | 100 | 1.62 | 20.04 | 20.4 | 9.35 | 30.4 |
| 51 .... do | 150 | 200 | 1.99 | 20.36 | 19.1 | 9.42 | 29.9 |
| 52 .... do | 150 | 400 | 2.08 | 21.03 | 16.4 | 9.68 | 27.9 |
| 53 .... do | 110 | 20 | 14.3 | 23.96 | 4.8 | 10.42 | 22.4 |
| 54 .... do | 130 | 46 | 2.94 | 21.39 | 15.0 | 10.75 | 20.0 |
| 55 .... do | 170 | 176 | 1.78 | 15.59 | 38.1 | 7.35 | 45.3 |
| 56 .... do | 190 | 288 | 1.61 | 18.13 | 28.0 | 7.25 | 46.0 |

Figure 5:
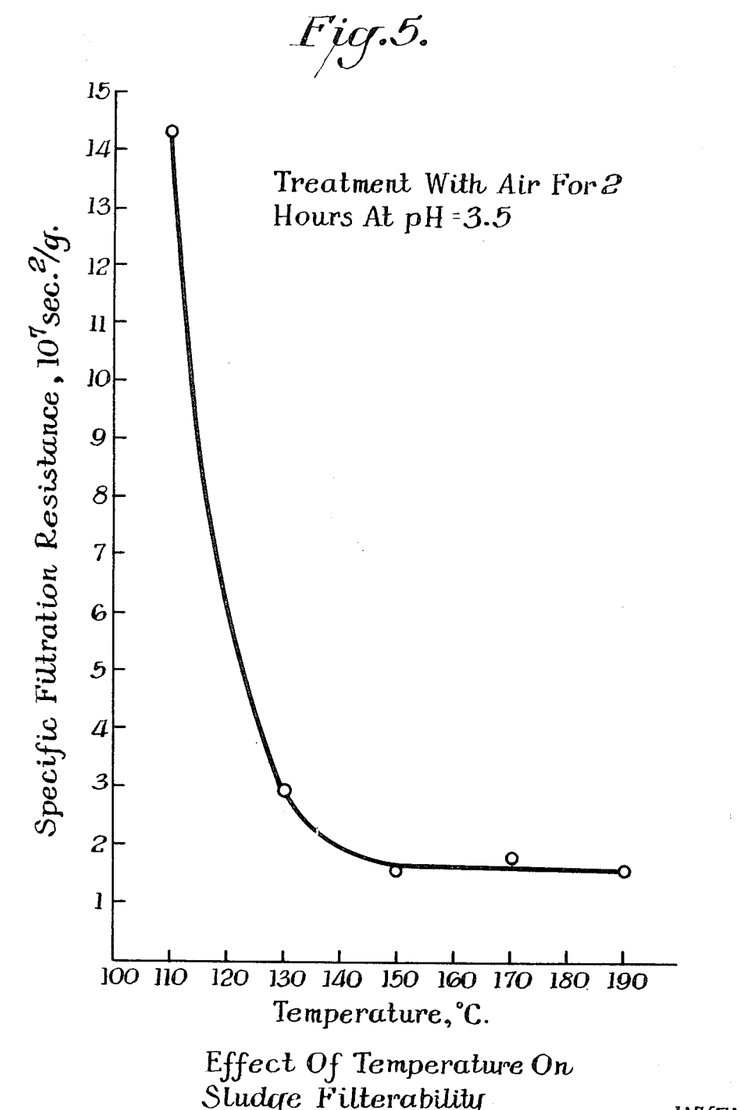
FIG. 5 is a plot of specific filtration resistance, $10^7$ sec.$^2$/g. versus temperature, ° C., for a fourth activated sewage sludge after treatment with air for 2 hours at pH=3.5.
Figure 6A:
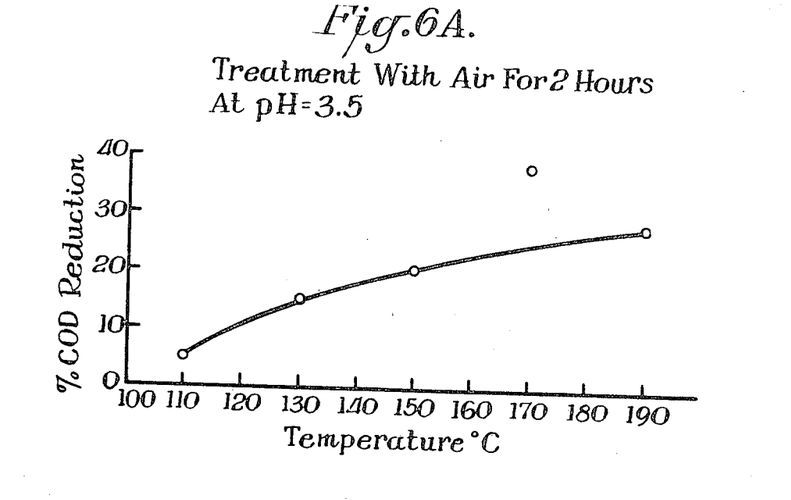
FIGS. 6A and 6B are, respectively, plots of percent COD reduction and percent solids reduction, individually, versus temperature, ° C., for the activated sewage sludge of FIG. 5 after treatment with air for 2 hours at pH=3.5.
Figure 6B:
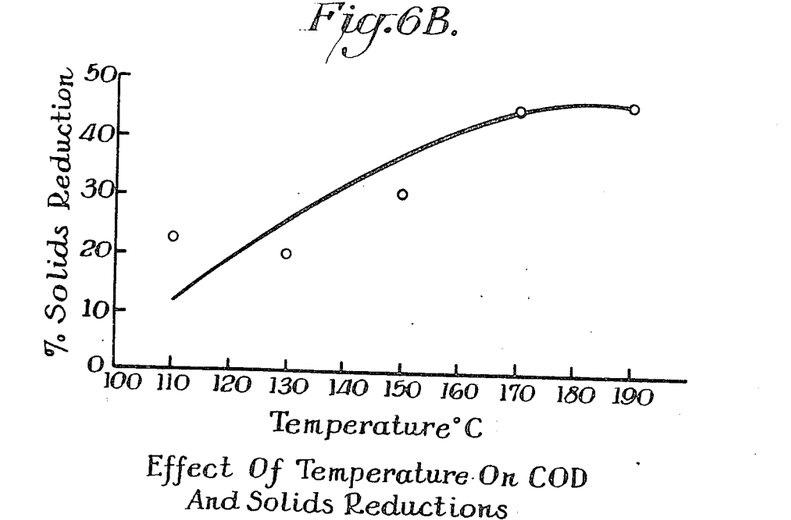

FIG. 5 shows that the specific filtration resistance decreased sharply with increasing temperature up to 150° C., but remained nearly constant at higher temperatures. As shown in FIGS. 6A and 6B, COD and solids reductions continued to increase with temperature.

Vacuum filtration of untreated sludges gave cakes containing about 82% moisture. After optimum treatment with air for 2 hours at 150° C., 100 p.s.i.g. and pH=3.5, room-temperature filtration gave moisture contents ranging from 73.1 to 77.6%. The average moisture content was 76%. Inadequate aeration (Run No. 59) gave a wetter cake, while treatment at higher temperatures of 170 and 190° C. (Runs No. 55 and 56) gave considerably drier cakes.

Cakes with moisture contents of 82 to 86%, obtained from untreated sludges, are fairly fluid and appear to have consistencies similar to toothpaste. However, the filter cakes of treated sludges (70 to 77% moisture content) are rather dry and resemble clay. This results both from the reduction in moisture content and also from the removal of slimy constituents during the treatment. Untreated sludge was found to have an ash content of 21%, while treated sludge had an ash content of 35%. From this, it is apparent that my treatment has preferentially reduced the organic content of the sludge solids.

The COD of the filtrate is also of interest, since the filtrate is, of course, recycled to the activated sludge process for further treatment. Two measurements were made, which gave values of 6.34 and 7.00 g. COD/liter. This compares with an average COD content of 1.5 g./liter in the aqueous waste from which the activated sludge was originally produced. However, because intervening conventional processing reduces the volumes handled, the filtrate recycled is relatively small and its return to the activated sludge process increases the COD loading by only about 8%.

(e) Miscellaneous tests

Chlorination has been mentioned recently as effective in obtaining a readily dewaterable sludge (refer J. WPCF (Water Pollution Control Federation) 40, pp. 1434–42 (1968), A. E. Sparr and U.S. Pats. 2,043,458 and 3,300,402). Sparr's review recommends the addition of some lime after the chlorine treatment to raise the pH to a satisfactory level.

Accordingly, Run Nos. 92 and 96, Table 7 infra, were conducted with the recommended chlorine dosage and somewhat different $Ca(OH)_2$ additions to adjust the pH values appropriately for flocculation. In both cases, there was an order-of-magnitude reduction in the specific filtration resistance as compared with untreated sludge. However, results for Run No. 97 show that chlorination, followed by heating to 150° C., and then liming to pH=4.1 gives a second order-of-magnitude reduction in specific filtration resistance. Still, the results are not nearly as good as those achieved by the process of this application.

Cold acidification of sludge (Run No. 93) gave a small reduction in specific filtration resistance. Acidification to a pH of 3.5, followed by heating to 150° C. without aeration (Run No. 94), gave results comparable to chlorination plus heating to 150° C. Heating only (Run No. 95), the process of U.S. Pat. 2,075,224, actually increased the specific filtration resistance as compared to the untreated sludge.

The use of various acidifying agents other than $H_2SO_4$ was also investigated. As hereinbefore reported with respect to Table 3, Run No. 43, HCl is as effective as $H_2SO_4$. $HNO_3$ (Run No. 98) also gives some improvement. A lower pH (more $HNO_3$) was employed because of possible acid consumption during my digestion, since $HNO_3$ can also act as an oxidizing agent. This lower pH, and some difficulty encountered with the gas disperser, may have been responsible for the somewhat higher specific filtration resistance. Overall, experiments with the several acidifying agents indicated that they were about equal in their effectiveness.

TABLE 7.—MISCELLANEOUS TESTS

| Run No. | Sludge No. | Method of treatment | Temp., °C. | Time, hr. | Final pH | Filtration resistance, $10^7$ sec.$^2$/g. | Solids, g./l. |
|---|---|---|---|---|---|---|---|
| 92 | 8 | 7.5% $Cl_2$+8.4% $Ca(OH)_2$ addition* | 23 | 0.12 | 4.1 | 22.8 | 15.26 |
| 93 | 8 | $H_2SO_4$ addition only (no heat, no air) | 23 | | 3.6 | 62.3 | 14.29 |
| 94 | 9 | $H_2SO_4$ addition to pH=3.5 (no air) | 150 | 2 | 4.3 | 14.0 | 10.80 |
| 95 | 9 | Heating only (no air, no acid) | 150 | 2 | 7.1 | 7,750 | 7.58 |
| 96 | 11 | 7.5% $Cl_2$+12.6% $Ca(OH)_2$ addition* | 25 | 0.13 | 5.0 | 137 | 10.61 |
| 97 | 11 | 7.5 $Cl_2$, heating, $Ca(OH)_2$ addition* | 150 | 2 | 4.1 | 14.0 | 3.63 |
| 98 | 11 | $HNO_3$ to pH=2.5 and aeration | 150 | 2 | 3.5 | 3.94 | 5.17 |

*Amounts shown are percentages of suspended solids (dry basis).

The following test was run on an activated sanitary sewage sludge obtained from the secondary clarifier of a municipal sewage treatment plant. As-received inspection showed the sludge to contain a considerable fraction of suspended primary solids, probably due to the fact that the activated sludge process was operating relatively poorly (i.e., 50% or less BOD removal) in this instance.

A 400 ml. sludge sample was acidified with sulfuric acid to a pH of 3.5. It was then treated with air for two hours at 150° C. under a total pressure of 100 p.s.i.g. with the following results:

| Run | Sludge type | Method of treatment | Filtration resistance $10^7$ sec.$^2$/g. | COD, g./l. | Solids, g./l. |
|---|---|---|---|---|---|
| | WA | Untreated (pH=6.2) | 1,170 | 13.53 | 10.03 |
| 1 | WA | $H_2SO_4$ plus air | 1.43 | 13.23 | 7.12 |
| 2 | WA | do | 1.56 | 12.56 | 6.32 |

There was good reproducibility with respect to the specific filtration resistance. The values $1.43 \times 10^7$ and $1.56 \times 10^7$ sec.$^2$/g. for sanitary sewage compared favorably with those of $1$–$2 \times 10^7$ sec.$^2$/g. hereinbefore reported for industrial plant activated sludge.

The reductions in COD and suspended solids are not quite as large as for the industrial sludge; however, it is believed that this was due to the relatively large fraction of primary solids in the municipal sludge tested. The somewhat larger COD and solids reductions achieved in Run No. 2 over Run No. 1 may have been due to increased aeration during the former.

On the basis of the foregoing, this invention is seen to be equally effective in the treatment of municipal activated sludge as it is for industrial types.

In summary, partial oxidation of acidified activated sludge at elevated temperature and pressure improved the filtration characteristics.

The lowest specific filtration resistance was obtained by acidifying the sludge to a pH of about 3.5 before digestion. However, COD and solids reductions were both appreciably larger at even lower pH. The required residence time is probably a function of the temperature. The optimum residence time at 150° C. was 2 hours. The specific filtration resistance decreased sharply with increasing temperature up to 150° C., but there was little advantage in going to higher temperatures. Pressure did not have much effect. However, the operating pressure should be sufficiently high to prevent significant evaporation of water during treatment. This would require a pressure of about 100 p.s.i.g. at 150° C.

Aeration of the activated sludge during digestion was found to be an essential requirement. Without aeration, the specific filtration resistance was an order-of-magnitude higher than with aeration. Total air flow is not critical above about 60% of the sludge COD. Agitation was found to be desirable.

The best process conditions are, then, aeration under agitation for 2 hours at 150° C., 100 p.s.i.g. and a pH of 3.5.

This gives consistently good results. Thus, specific filtration resistances after the optimal treatment varied only to a relatively small extent in the range of $1-2 \times 10^7$ sec.$^2$/g., even though the as-received untreated sludges showed large variations in the range of from $32 \times 10^7$ to $5600 \times 10^7$ sec.$^2$/g.

Vacuum filtration gave filter cakes averaging 76% moisture content, as compared with about 82% for untreated sludge.

The moisture content was found to decrease with decreasing cake thickness and with increasing filtration temperature. For example, filtration at about 60° C. gave a 3 mm. thick cake having a moisture content of 70.5%.

My process preferentially removes organic solids, thereby increasing the ash content of the suspended solids from about 21% initially to about 35% finally. COD reductions of the order of 12% and reductions in suspended solids of 44% were achieved. The COD of the filtrate obtained averaged 6.7 g./liter.

Figure 7:
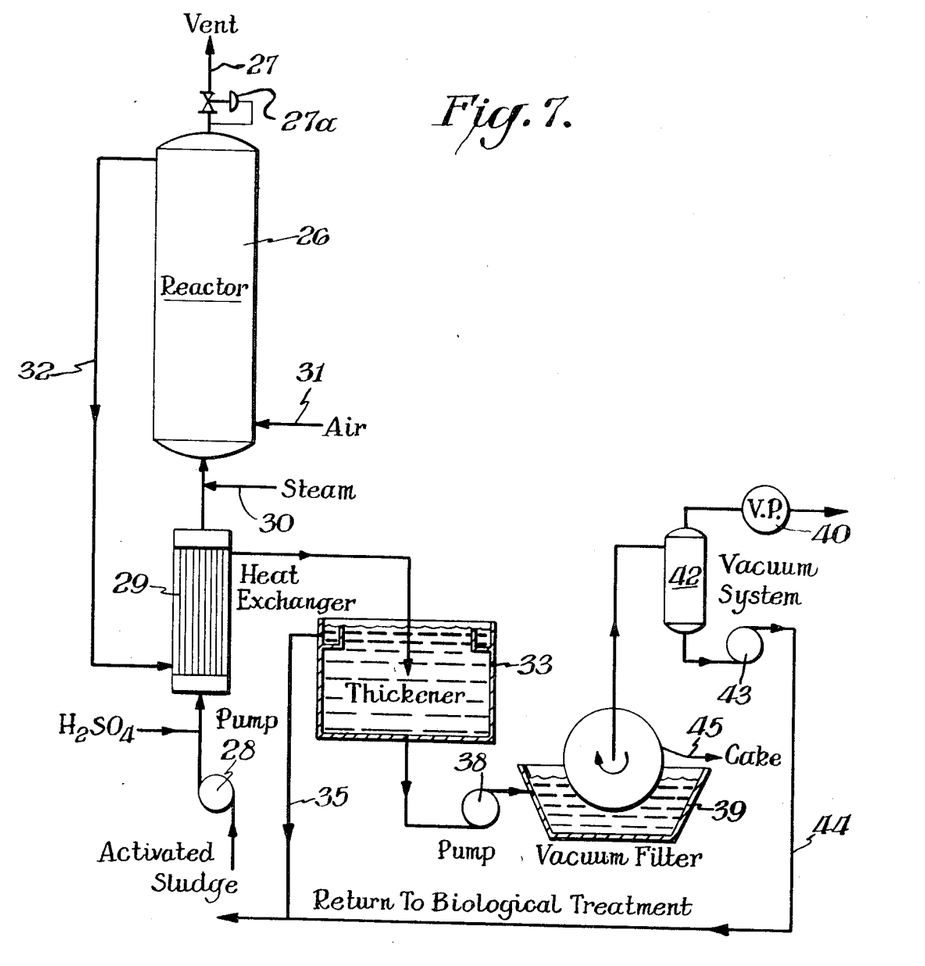
FIG. 7 is a schematic flow sheet of preferred apparatus for carrying out the process of this invention.

An apparatus for carrying out applicant's process commercially is shown schematically in FIG. 7. This employs a continuous reactor 26 vented via pressure reducing valve 27a installed in top line 27 fresh raw sludge being supplied by pump 28 via shell-and-tube heat exchanger 29.

Additional heat is supplied by steam line 30, either by direct injection, as shown, or by a steam coil immersed in the reactor contents. Air is supplied by a suitable disperser, not detailed, through line 31. Digested sludge is displaced by fresh material and is drawn off through line 32, routed through heat exchanger 29 and then passes, at a temperature of about 50° C., to a conventional thickener 33. Here supernatant liquor is drawn off via line 35 for recycle to the activated sludge process or for other disposition, as desired.

Thickened sludge is withdrawn by suction pump 38 and passed to vacuum filter 39, the warm 50° C. temperature both increasing the filtration rate and reducing the moisture content of the filter cake. A conventional vacuum pump 40 serves filter 39, collecting removed liquor in receiving tank 42 and discharging through pump 43 to line 44 manifolded with line 35.

The dewatered sludge is removed as a filter cake at 45.

What is claimed is:

1. The process of improving the filterability of activated sewage sludge comprising: first, adjusting the pH of said sludge to a value in the range of about 2.0 to 5.0, second, heating said sludge to a temperature in the range of about 120–170° C. while maintaining sufficient pressure to keep the water content of said sludge largely liquid and third, oxidizing said sludge by contact with an oxygen-containing gas while maintaining said temperature and said pressure for a period of time sufficient to reduce the chemical oxygen demand of said sludge by about 5–20%.

2. The process of claim 1 wherein said pH is adjusted to a level of about 3.5 and said sludge is maintained heated to about 150° C.

References Cited

UNITED STATES PATENTS

| | | | |
|---|---|---|---|
| 3,272,740 | 9/1966 | Gitchel et al. | 210—63 |
| 3,359,200 | 12/1967 | Gitchel et al. | 210—63 |
| 3,060,118 | 10/1962 | Schoeffel | 210—63 X |
| 3,300,402 | 1/1967 | Grich et al. | 210—6 X |

OTHER REFERENCES

Wilson, J. A., et al., The Role of Acidity in the Dehydration of Sewage Sludge, J. Ind. & Eng. Chem., vol. 13, May 1921, pp. 406–410 (photostat copy in 176), 210-10.

Abel, F., et al., Oxidation and Stabilization of Sewage Sludges, etc., Sew. and Ind. Wastes, vol. 26, December 1954, pp. 1450–1452 (POSL).

MICHAEL ROGERS, Primary Examiner

U.S. Cl. X.R.

210—10, 71